United States Patent
Vidal et al.

(10) Patent No.: US 9,982,782 B2
(45) Date of Patent: May 29, 2018

(54) DRAIN FOR DYNAMIC SEALING ASSEMBLY

(71) Applicant: POCLAIN HYDRAULICS INDUSTRIE, Verberie (FR)

(72) Inventors: Stephane Vidal, Verberie (FR); Gilles Grillon, Verberie (FR); Bertrand Bonnomet, Verberie (FR); Jeremie Mulot, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 500 days.

(21) Appl. No.: 14/367,219

(22) PCT Filed: Dec. 20, 2012

(86) PCT No.: PCT/EP2012/076385
§ 371 (c)(1),
(2) Date: Jun. 19, 2014

(87) PCT Pub. No.: WO2013/092863
PCT Pub. Date: Jun. 27, 2013

(65) Prior Publication Data
US 2014/0345448 A1    Nov. 27, 2014

(30) Foreign Application Priority Data
Dec. 21, 2011   (FR) ...................................... 11 62207

(51) Int. Cl.
*F16J 15/00* (2006.01)
*F03C 1/00* (2006.01)
(Continued)

(52) U.S. Cl.
CPC ............. *F16J 15/004* (2013.01); *F03C 1/002* (2013.01); *F03C 1/02* (2013.01); *F16D 55/24* (2013.01); *F16D 65/005* (2013.01)

(58) Field of Classification Search
CPC .... F04B 1/063; F04D 1/12; F03C 1/02; F03C 1/002; F16D 55/36; F16D 55/24; F16D 65/005; B60T 1/06; F16J 15/004
(Continued)

(56) References Cited

U.S. PATENT DOCUMENTS 4,410,187 A * 10/1983 Legoy ...................... F04D 1/12
                                                                277/347
4,807,519 A *  2/1989 Wusthof ................. F04B 1/063
                                                                 91/492
(Continued)

FOREIGN PATENT DOCUMENTS

DE            103 19 821 A1   11/2004
DE      10 2009 014 214 A1    6/2010
EP              1 602 832 A1  12/2005

*Primary Examiner* — Essama Omgba
*Assistant Examiner* — Connor Tremarche
(74) *Attorney, Agent, or Firm* — Womble Bond Dickinson (US) LLP (57) ABSTRACT

The present invention relates to a system comprising: a shaft having a distal end and a proximal end; a casing defining a housing in which a hydraulic device is rotatably mounted on the shaft; and a sealing element comprising a low pressure dynamic sealing means and a reinforced dynamic sealing means formed by a static seal tightly mounted on a friction pad, such as to isolate the dynamic sealing means from the rotating hydraulic device, said sealing element defining a discharge chamber between the dynamic sealing means and the reinforced dynamic sealing means, which discharge chamber is connected to a drain via a pipe arranged on the surface of the shaft, between the hydraulic device and the shaft, so as to discharge the fluid located in the discharge chamber, such that said discharge chamber is not subjected to the pressure in the casing of the hydraulic device.

8 Claims, 7 Drawing Sheets

(51) Int. Cl.
    *F03C 1/02*      (2006.01)
    *F16D 55/24*     (2006.01)
    *F16D 65/00*     (2006.01)
(58) Field of Classification Search
    USPC .......................................... 91/491; 277/347
    See application file for complete search history.

(56) References Cited

U.S. PATENT DOCUMENTS

| | | | | |
|---|---|---|---|---|
| 4,898,076 A | * | 2/1990 | Bigo | F03C 1/045 91/491 |
| 4,947,966 A | * | 8/1990 | Huff | B60T 1/062 188/170 |
| 2005/0252730 A1 | * | 11/2005 | Auer | F16D 55/36 188/71.5 |
| 2014/0345448 A1 | * | 11/2014 | Vidal | F16J 15/004 91/491 |

* cited by examiner

DRAIN FOR DYNAMIC SEALING ASSEMBLY

GENERAL TECHNICAL FIELD

The present invention relates to the field of hydraulic devices fitted with a dynamic gasket.

More precisely, it relates to a device adapted to support pressure points in the casing of a hydraulic device, comprising means for discharging the leaks of such a device.

Hydraulic device means for example a hydraulic motor, a hydraulic pump or a hydraulic brake, or even the combination of several of these devices.

STATE OF THE ART

For a hydraulic device mounted on a shaft, in particular in the case of a fixed shaft on which is mounted a motor with rotating casing driving a wheel, it is necessary to have sealing to the side of the shaft; for example sealing of oil/air type in the case of a hydrostatic transmission motor forming a bearing, or of oil/grease type in the case of a hydrostatic transmission motor added in the form of a hydrobase to a shaft already carrying the wheel bearing.

The gasket for creating this sealing must have good sealing during the expected mileage of the hub (friction, wear), must not leak under pressure of the casing and support the casing pressure peaks for the system using the casing pressure to manoeuvre hydraulic members, for example dog-clutch or free-spool operations of motors.

Figure 1:
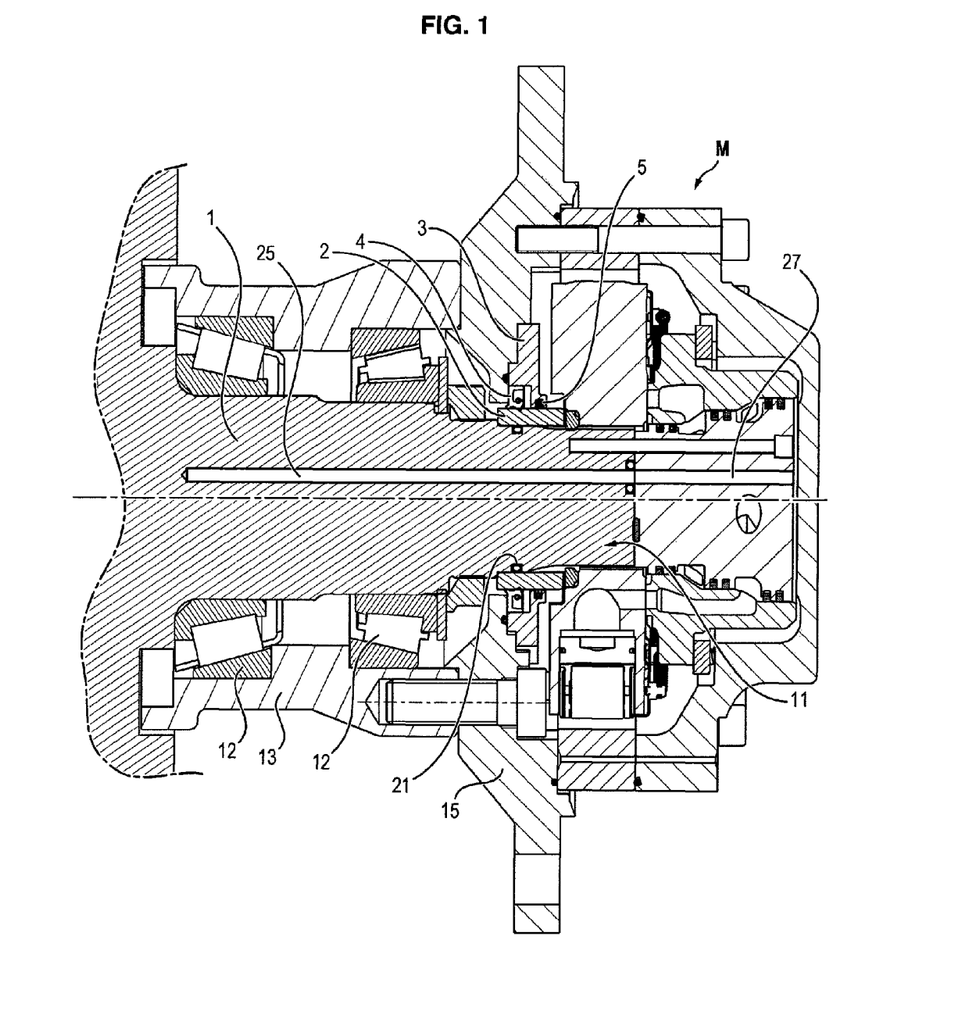
FIGS. 1 and 2, described previously, present a system according to the state of the art.
Figure 2:
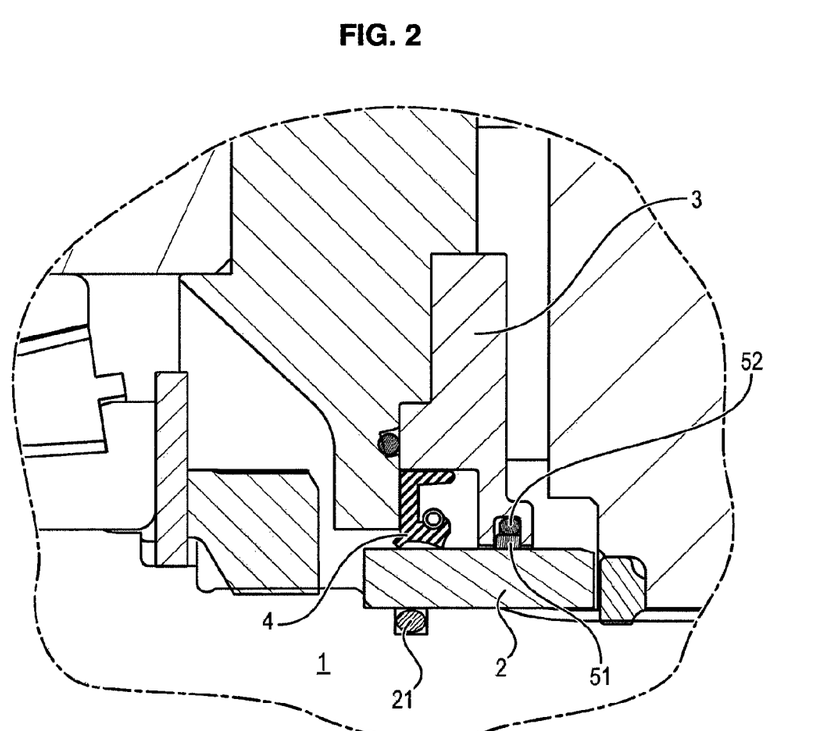

FIG. 1 shows an example of a system according to the state of the art, and FIG. 2 shows a detailed view of a portion of FIG. 1.

This figure shows a shaft 1 presenting a proximal end for example for mounting the shaft pivoting relative to an axle, and a free distal end 11 on which is mounted a hydraulic device, here a hydraulic motor M. The shaft 1 is fitted with one or more rollers 12, here two roller bearings, arranged in a roller casing 13. A flange 15 is fixed to this casing 13, this flange enabling a wheel to be affixed.

Sealing is necessary between the hydraulic motor M and the shaft 1 to maintain and avoid degrading of the lubricant, typically oil or grease for lubrication of the motor M; this sealing being for example of type oil/air in the case of a hydrostatic transmission motor forming a bearing, or of oil/grease type in the case of a hydrostatic transmission motor added to a shaft already carrying the bearing.

Frequently, in the case of hydraulic units added to axles or vehicle wheel spindles, the shafts do not have much hardness, and therefore cannot support the permanent friction of a dynamic sealing member mounted directly on the shaft. Sometimes also, the material or mode of machining or finishing of these shafts does not produce a friction surface of sufficient quality to guarantee sufficient shelf life of a dynamic gasket on its friction surface, and more precisely with respect to the quality of the surface state: roughness, geometric defects.

A friction surface 2, commonly called a shrink-disk 2, is therefore added in this case, that is, a piece made from material having sufficient hardness, geometry (in the sense of circularity, straightness) and surface state to be able to create good friction range. The shrink-disk 2 is tightly mounted round the shaft 1, with sealing being ensured by a static sealing gasket 21, typically an O-ring.

A seal carrier 3 is mounted about this shrink-disk 2, on the flange 15, the seal carrier 3 serving as support for a gasket 4 creating low-pressure dynamic sealing between the shrink-disk 2 and the seal carrier 3. So, during relative rotation of the motor M relative to the shaft 1 (or vice versa), the seal carrier 3 rotates about the shrink-disk 2 and the shaft 1, and the gasket 4 is not directly in contact with the shaft 1 but the shrink-disk 2.

This is low-pressure dynamic sealing for the gasket 4 to the extent where this type of component is not adapted to resist high pressures likely to deform it and have it exit from its housing.

Such mountings also comprise the reinforced dynamic sealing means 5, formed for example by a pad 51 and an O-ring 52, stacked on the shrink-disk 2, or where appropriate directly on the shaft 1, and arranged in a housing of the seal carrier 3.

This reinforced dynamic sealing means 5 is placed so as to prevent the gaskets 4 from being directly exposed to a pressure peak in the casing of the motor M; it is therefore placed between the motor M and the gaskets 4, so as to isolate this gasket 4 relative to the casing of the motor M.

Pressure peaks can occur in the casing of the motor M during operation of the latter, and in particular for motors where casing pressure defined at some moments is exerted voluntarily, for example for dog-clutch and free-spool operations. For this purpose, a drain orifice communicating with the casing of the motor is provided. For the case of a motor M mounted on a shaft as shown in FIG. 1, a channel arranged in the shaft 1 and in the wiper respectively 25 and 27 connects the casing of the motor M to a drain orifice (not shown), here via the wiper and the shaft 1.

The pad 51 is made of friction material, and is kept in contact with the shrink-disk 2 by the O-ring 52 which in turn produces frictionless sealing with the seal carrier 3.

Such reinforced dynamic sealing means 5 are well known to those skilled in the art, and has been sold on motors of the Poclain Hydraulics brand for many years; an example here are motors sold under the name G4 since 1982 proposing such a reinforced dynamic sealing means as an option, or motors of the MS range the name of which includes the letter E, for example the motor designated by commercial code MS18-0-121-F12-1120-E00 available since March 1998.

Yet, such constructions result in a progressive pressure rise between reinforced dynamic sealing 5 and the gasket 4 due to accumulation of fluid between reinforced dynamic sealing 5 and the gasket 4 due to leaks in the reinforced dynamic sealing 5. It is consequently necessary to provide a discharge system for fluid accumulating in this housing, which is especially delicate to do to the extent where there is tight stacking of components between this housing and the casing of the motor. Also, in the case of fixed-shaft motors with rotating casing, the casing is not always at zero pressure and does not prevent pressure in the housing.

In general, in many motors having a pressurised chamber closed by the dynamic gasket, there is the difficulty of having to go through a stack of tight components to discharge fluid to a non-pressurised space.

PRESENTATION OF THE INVENTION

The aim of the invention is to rectify this problem and propose for this purpose a system comprising:
- a shaft presenting a distal end and a proximal end,
- a casing defining a housing in which a hydraulic device is rotatably mounted on the shaft,
- a sealing member comprising low-pressure dynamic sealing means and reinforced dynamic sealing means formed from a static sealing gasket tightly mounted on a friction pad to isolate said dynamic sealing means from the hydraulic device rotating, and defining a discharge chamber between the dynamic sealing means and the reinforced dynamic sealing means, characterized in that the discharge chamber is connected to a drain via a pipe arranged on the surface of the shaft, between the hydraulic device and the shaft so as to discharge the fluid located in the discharge chamber, such that said discharge chamber is not subjected to the pressure prevailing in the casing of the hydraulic device.

As a variant, this system comprises one or more of the following characteristics, taken independently or in combination:

said pipe arranged between the hydraulic device and the shaft is a groove made at the periphery of the shaft; from its distal end to the discharge chamber;

the system also comprises a channel arranged at the distal end of the shaft for making a fluidic connection between said pipe arranged between the hydraulic device and the shaft and an axial pipe arranged in the shaft;

said sealing member comprises a friction surface tightly mounted on the shaft, on which is mounted the low-pressure dynamic sealing means, said friction surface comprising a bore terminating on the pipe arranged on the surface of the shaft, so as to connect the discharge chamber to said pipe;

the hydraulic device is housed in a casing defining a casing pressure, and also comprises means creating a fluidic connection between:

a second axial pipe arranged in the shaft, terminating at the distal end of the shaft, and
the casing, so as to enable regulation of the casing pressure.

According to a particular embodiment, said hydraulic device is a hydraulic motor comprising
a multilobe cam fixed to the casing,
a cylinder block placed on the shaft opposite the cam,
pistons guided to slide radially in respective cylinders of the cylinder block and supported on the lobes of the cam, and
a distributor intended to successively apply pressurised fluid to the pistons, arranged at the distal end of the shaft,
the sealing means creating dynamic sealing between the shaft and the housing defined by the casing.

In a variant of this embodiment, said channel at the distal end of the shaft is arranged in the shaft or in the distributor.

According to another variant, an axial traversing pipe is arranged in the distributor to make fluidic connection between the second axial pipe arranged in the shaft and the casing, independently of said drain connected to the discharge chamber.

According to another embodiment, said hydraulic device is a multidisc brake, comprising
a plurality of discs mounted on a splined sleeve fixed relative to the shaft,
a plurality of complementary discs mounted non-rotatably relative to the casing,
control means of discs adapted to control their contacting,
in which said pipe arranged between the hydraulic device and the shaft is a groove made at the periphery of the shaft defining a pipe between the shaft and the splined sleeve, from the distal end of the shaft to the discharge chamber.

As a variant, said pipe arranged between the hydraulic device and the shaft is connected to the housing of the casing comprising said discs via a valve adapted to produce discharge of the pressure in said housing via said pipe when the pressure in said housing is greater than or equal to a threshold value.

The invention also relates to a system comprising a shaft presenting a distal end and a proximal end, a casing defining a housing in which are arranged a hydraulic motor and a multidisc brake, the hydraulic motor comprising:
a multilobe cam fixed to the casing,
a cylinder block placed on the shaft opposite the cam,
pistons guided to slide radially in respective cylinders of the cylinder block and supported on the lobes of the cam, and
a distributor intended to successively apply pressurised fluid to the pistons, arranged at the distal end of the shaft, the multidisc brake comprising:
a plurality of discs mounted on a splined sleeve fixed relative to the shaft,
a plurality of discs complementary mounted non-rotatably relative to the casing,
control means of complementary discs adapted to control contacting of the discs, said system further comprising a sealing member creating sealing between the multidisc brake and the casing, the sealing member comprising dynamic sealing means and reinforced dynamic sealing means formed from a static sealing gasket tightly mounted on a friction pad, so as to isolate said dynamic sealing means of the hydraulic device rotating, and defining a discharge chamber between the dynamic sealing means and the reinforced dynamic sealing means, characterized in that said shaft comprises a pipe arranged on its surface between the splined sleeve and the shaft connecting the discharge chamber to a drain so as to discharge fluid located in the discharge chamber such that said discharge chamber is not subjected to the pressure prevailing in the casing in which the motor and the brake are arranged.

PRESENTATION OF FIGURES

Other characteristics, aims and advantages of the invention will emerge from the following description which is purely illustrative and non-limiting and which must be considered in conjunction with the attached drawings, in which.

In all figures similar members bear identical reference numerals.

DETAILED DESCRIPTION

Figure 3:
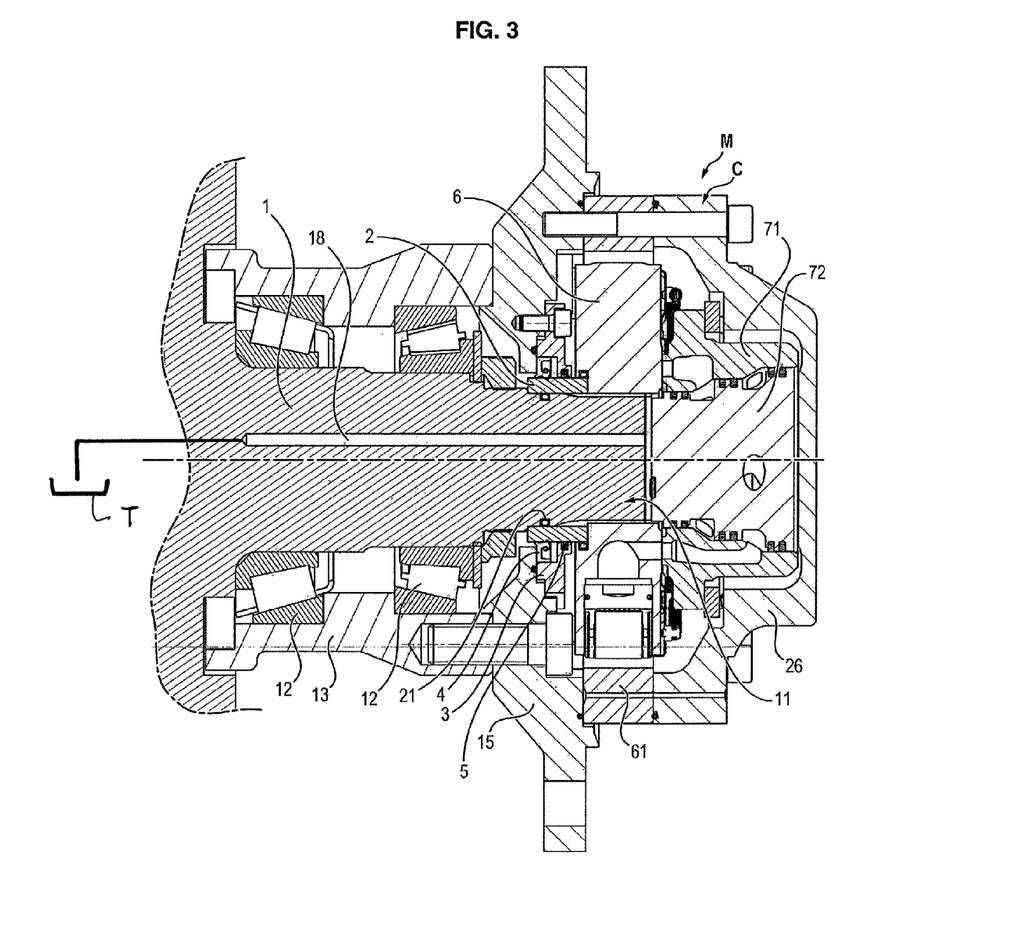
FIGS. 3 and 4 illustrate a system according to an aspect of the invention.
Figure 4:
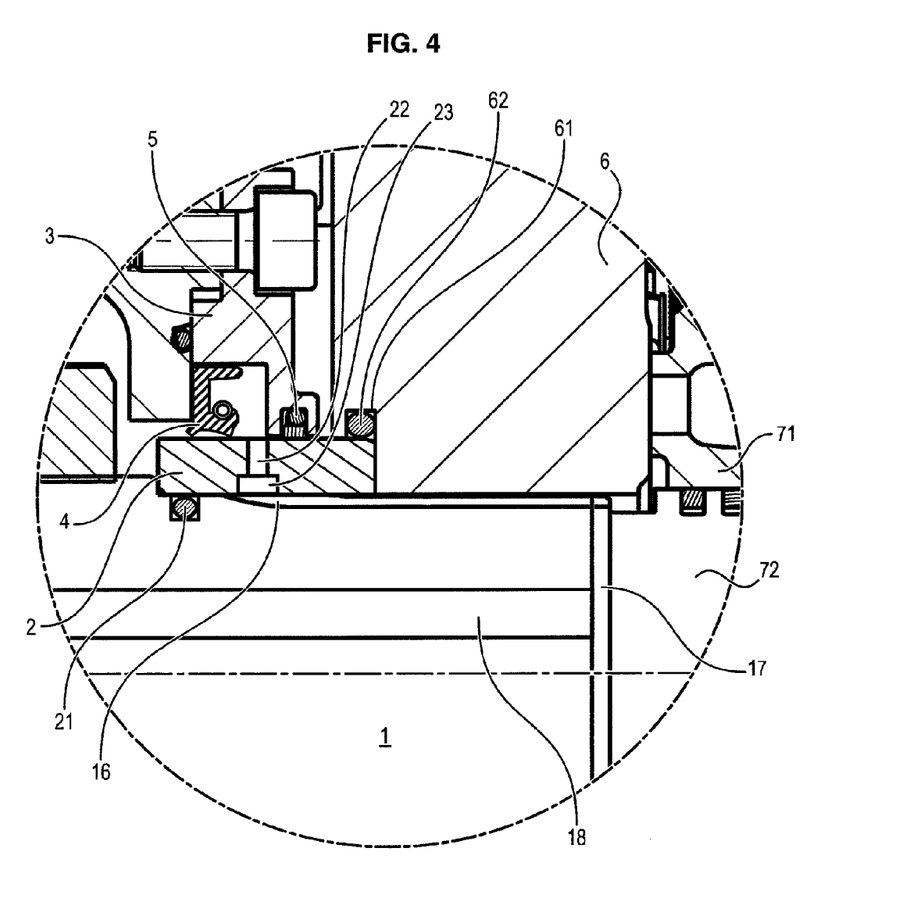

FIG. 3 presents an embodiment of a system according to an aspect of the invention; FIG. 4 presents a detailed view of a portion of this system.

This figure presents a shaft 1, presenting a free distal end on which is mounted a hydraulic device, here a hydraulic motor M, and a proximal end. The shaft 1 is fitted with one or more rollers 12, here two bearing rollers, arranged in a roller casing 13. A flange 15 is fixed to this casing 13, this flange enabling a wheel to be affixed.

The motor M also comprises:
 a cylinder block 6 mounted opposite a multilobe cam 61, the cylinder block 6 comprising a plurality of housings in which are mounted sliding pistons adapted to move on contact by the multilobe cam 61,
 a distributor 7 ensuring distribution of fluid in the cylinder block 6, comprising an wiper 72 in the extension of the shaft 1, and a valve plate 71 enclosing the wiper 72.

The hydraulic motor M is housed in a casing, here formed by the flange 15, of the multilobe cam 61 and a lid 26. The casing will be designated more generally by reference C.

As overall in FIG. 1, sealing of the motor M is effected by means of a friction surface 2 mounted on the shaft 1, on which is mounted a seal carrier 3 serving as support for a gasket 4 creating dynamic sealing between the shrink-disk 2 and the seal carrier, and comprising reinforced dynamic sealing means 5, formed by a pad 51 and an O-ring 52 stacked on the shrink-disk 2 and arranged in a housing of the seal carrier 3.

This reinforced dynamic sealing means 5 is placed so as to prevent the gasket 4 from being directly exposed to a pressure peak in the motor M; it is therefore arranged between the motor M and the gasket 4 so as to isolate this gasket 4 relative to the motor M.

A discharge chamber is now defined between the gasket 4 and reinforced dynamic sealing 5, delimited on either side by the shrink-disk 2 and the seal carrier 3.

The shaft 1 has a splined distal end 11, defining one or more longitudinal throats 16 on its external periphery. The shrink-disk 2 is tightly mounted on these slots, the sealing between the shrink-disk 2 and the shaft 1 being produced by way of a static sealing gasket 21; typically an O-ring arranged in a throat arranged in the shaft 1. The cylinder block 6 is therefore also mounted on this end splined of the shaft 1.

Also, in the embodiment shown, the cylinder block 6 partially encloses the shrink-disk 2; sealing between the shrink-disk 2 and the cylinder block 6 is made by means of a sealing gasket 62, typically an O-ring arranged in a housing 61 arranged in the cylinder block 6 opposite the shrink-disk 2.

In the case of a shaft 1 having no splined distal end 11, one or more longitudinal throats can be arranged on the periphery of the shaft 1, typically by machining.

Whether by utilising existing slots or by creating longitudinal throats on the periphery of the shaft 1, this avoids forming bores internal to the shaft, and in particular radial bores or longitudinal bores near the periphery of the shaft, such bores being delicate to make and liable to embrittle the shafts.

The discharge chamber collects fluid originating from the motor and passing through the reinforced dynamic sealing 5.

Consequently, during use of the hydraulic motor M, fluid, typically oil, accumulates in this discharge chamber.

To enable evacuation of this fluid which accumulates in the discharge chamber, the invention proposes connecting it to a drain via a pipe arranged on the surface of the shaft, between the motor M and the shaft so as to discharge fluid located in the discharge chamber, this drain being fluidly isolated from the casing and therefore from the casing drain 25, as shown in FIG. 3.

In the embodiment represented, the drain is created by means of a bore 22 made in the shrink-disk 2, which passes through said shrink-disk 2 to connect the discharge chamber to the longitudinal throats 16 defined by the end splined of the shaft 1. Other variants are possible, especially variants combining a longitudinal bore and a blind radial bore, joining up to terminate radially from the shrink-disk 2.

In the variant shown, a throat 23 is arranged on the internal periphery of the shrink-disk 2, in which the bore 22 terminates. This throat 23 extends advantageously over the entire periphery of the shrink-disk 2, forming a connection between the bore 22 and the longitudinal throats 16 defined by the splined end of the shaft 1, that is, between these longitudinal throats 16 and the discharge chamber. More generally, the throat 23 increases the passage surface between the bore 2 and the longitudinal throats 16 to facilitate passage of fluid located in the drainage chamber to the longitudinal throats 16. These longitudinal throats 16 are arranged between the shaft 1 and the hydraulic motor M mounted on the shaft 1.

The longitudinal throats 16 are connected to a first axial pipe 18 arranged in the shaft 1 via a channel 17 arranged at the distal end of the shaft 1 to make a fluidic connection between said pipe arranged between the longitudinal throats 16 and the first axial pipe arranged 18 in the shaft 1.

The first axial pipe arranged 18 in the shaft 1 is typically connected to an atmospheric pressure tank T, accordingly forming a drain for the discharge chamber.

The discharge chamber is connected to an atmospheric pressure tank T, allowing discharge of fluid accumulating there, and is fluidly isolated from the casing of the motor M where pressure is typically higher, especially due to the sealing made between the shrink-disk 2 and the cylinder block 6.

The components of the sealing member, and more particularly the gaskets 4 are protected both from pressure peaks which can occur in the casing of the motor M, and rises in pressure which could occur in the discharge chamber in the absence of a drain.

The invention forms a drain for the discharge chamber in spite of the tight assembly of components forming the motor M.

Figures 5, 6:
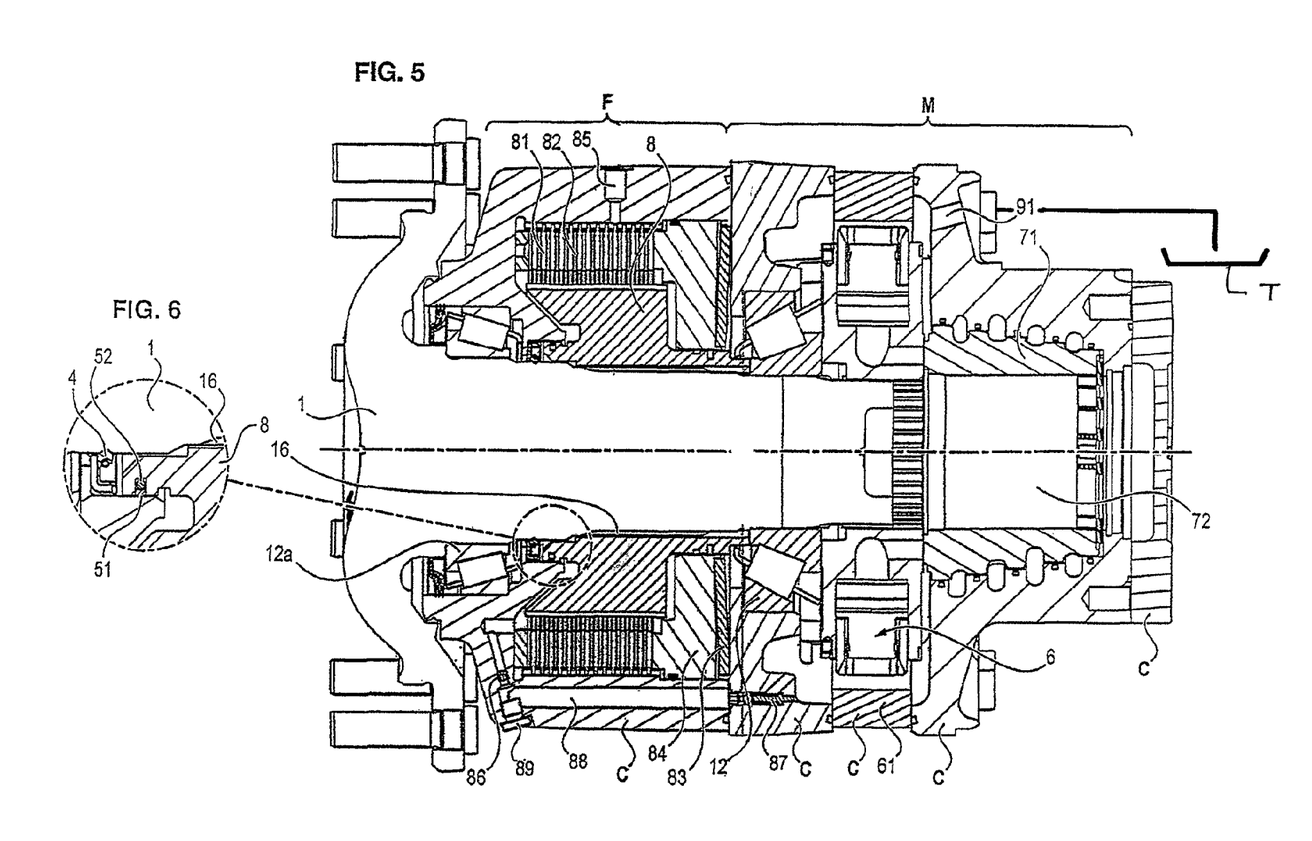
FIGS. 5 and 6 illustrate a system according to another aspect of the invention.

FIG. 5 shows another embodiment of a system according to an aspect of the invention. FIG. 6 presents a detailed view of a portion of FIG. 5.

In the embodiment shown, a hydraulic motor M and a brake F are mounted on a shaft 1 by means of a roller bearing 12 comprising two rollers 12a and 12b, the roller 12a being arranged between the brake F and the proximal end of the shaft 1, and the roller 12b being arranged between the brake F and the motor M; the hydraulic motor M and the brake F are housed in a casing C which is rotatably mounted relative to the shaft 1 (or vice versa) via the rollers 12.

The same applies as in FIGS. 3 and 4, where the motor M comprises a cylinder block 6, a multilobe cam 61, and a distributor 7 comprising a valve plate 71 and a wiper 72 creating fluid supply of the cylinder block 6.

The brake F comprises:
 a plurality of discs 81 mounted on a splined sleeve 8 fixed relative to the shaft 1,
 a plurality of complementary discs 82 mounted non-rotatably relative to the casing C,
 control means of complementary discs adapted to control their contacting with the discs mounted on the sleeve, typically a spring washer 83, commonly called «Belleville washer» linked to a piston 84 whereof displacement is controlled by a releasing orifice 85 arranged in the casing C to control the application of pressure to said piston 84, consequently controlling the contact or not of the discs 81 and 82, and therefore the braking or not of the rotation of the casing C relative to the shaft 1, that is, of the motor M relative to the shaft (or vice versa).

The casing C also comprises means for discharging pressure in the brake F to the casing of the motor M, specifically an irrigation nozzle 86 and an irrigation valve 87 connecting the brake F to the motor M.

The irrigation nozzle 86 determines the flow originating from the brake F, and more precisely the housing of the discs 81 and 82, which is fed to the irrigation valve 87. This irrigation valve 87 opens when the pressure in an irrigation chamber 88 between the irrigation nozzle 86 and the irrigation valve 87 reaches a threshold value, to discharge the pressure in this irrigation chamber 88 to the casing of the motor M.

The embodiment shown also illustrates a stopper 89 which blocks an opening of the irrigation chamber 88 arranged in the casing C, this opening resulting from machining of the different pipes in the casing C.

The low-pressure dynamic gasket 4, here a gasket, is mounted directly on the shaft 1 and forms dynamic sealing between the shaft 1 and the casing C. It is obvious that a shrink-disk can be adapted to this embodiment, as in FIGS. 3 and 4, in the same way as this embodiment without shrink-disk can be adapted to the embodiment shown in FIGS. 3 and 4.

The reinforced dynamic sealing means 5 is here arranged between the casing C and the splined sleeve 8; the latter comprising a housing in which are housed a pad 51 and a 52.

These reinforced dynamic sealing means 5 isolate the low-pressure dynamic gasket 4 of the chamber in which the discs 81 and 82 are housed such that pressure applied in this chamber does not impair the dynamic gasket 4.

In the same way as for the embodiment shown in the preceding figures, reinforced dynamic sealing 5 and low-pressure dynamic sealing 4 define a discharge chamber, in which the leaks originating from the housing of the discs 81 and 82 accumulate.

This discharge chamber is connected to a drain via a pipe arranged on the surface of the shaft, between the brake F and the shaft 1 and between the motor M and the shaft 1 so as to discharge the fluid located in the discharge chamber, the drain being fluidly isolated from the casing.

The drain is here a drain orifice 91 arranged in the casing of the motor M, connected to a tank T of pressure lower than the pressure in the casing of the motor M; typically an atmospheric pressure tank T.

The link between the discharge chamber and this drain orifice 91 is made by means of one or more throats 16 arranged on the surface of the shaft 1. In the case of a shaft having a splined portion, these throats can correspond to the slots of the shaft, for example one or more slots is the depth which is increased if necessary to ensure sufficient fluid flow.

In the embodiment shown, the throats 16 extend over the periphery of the shaft 1 substantially to the roller 12*b* of the roller bearing 12.

The fluid then passes via the roller 12*b* and via the casing of the motor M to rejoin the drain orifice 91.

Therefore, the discharge chamber is fluidly isolated from the housing of the discs 81 and 82, and the low-pressure dynamic gasket 4, is therefore not subjected to the pressure applied via the releasing orifice 85. Also, because the drain orifice 91 is arranged in the casing of the motor M, neither is the discharge chamber is subjected to pressure peaks which might occur in the casing of the motor M, such pressure peaks being discharged directly via the drain orifice 91.

By way of a variant (not shown), the throats 16 extending longitudinally over the periphery of the shaft 1 can be connected to a longitudinal pipe arranged in the shaft 1, as shown in FIGS. 3 and 4. The throats extend typically to the interface between the shaft 1 and the wiper 72, and a channel is made at the distal end of the shaft so as to make a fluidic connection between:
- the longitudinal throats 16, that is, the pipe arranged between both the motor M and the brake F and the shaft 1, and
- the axial pipe arranged in the shaft 1.

This produces a function similar to the embodiment illustrated, that is, leaks accumulating in the discharge chamber are discharged via a drain such that said discharge chamber is not subjected to the pressure prevailing in the casing of the hydraulic device, in this case the brake F and the motor M.

Figure 7:
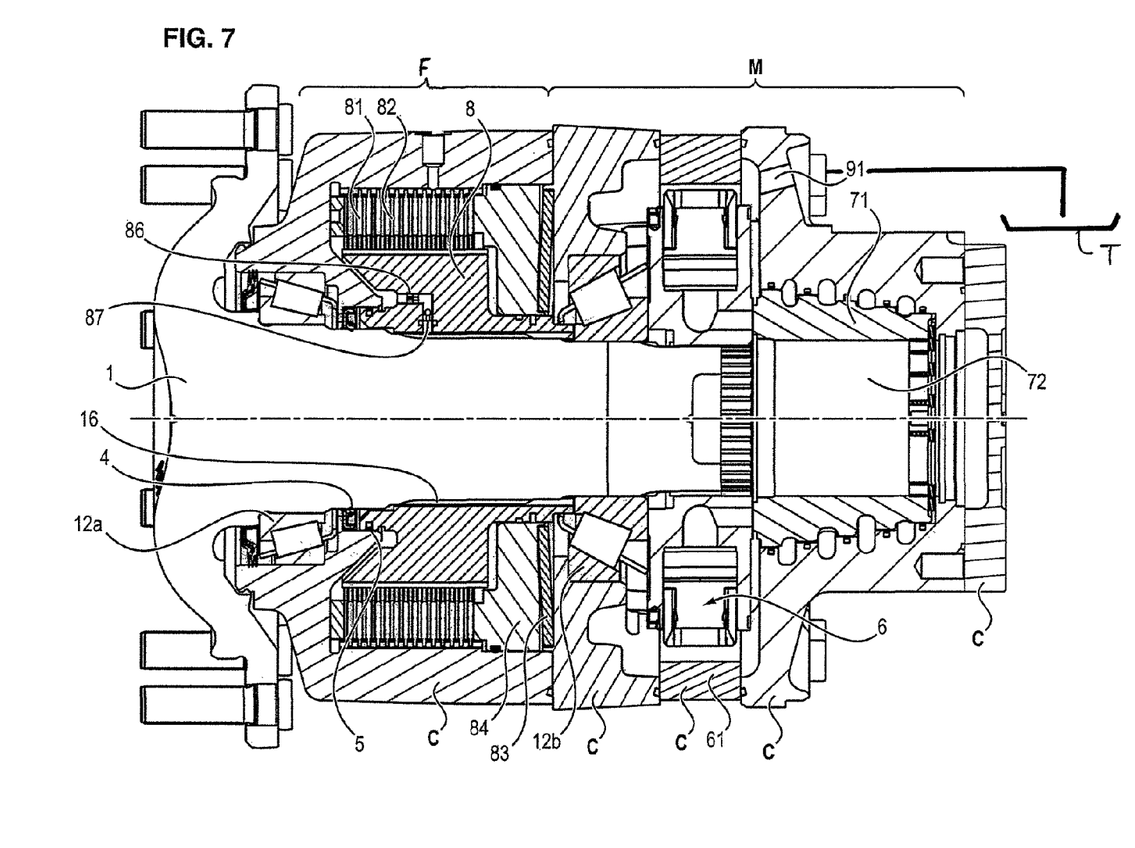
FIG. 7 illustrate a variant of the system presented in FIGS. 5 and 6.
Figure 8:
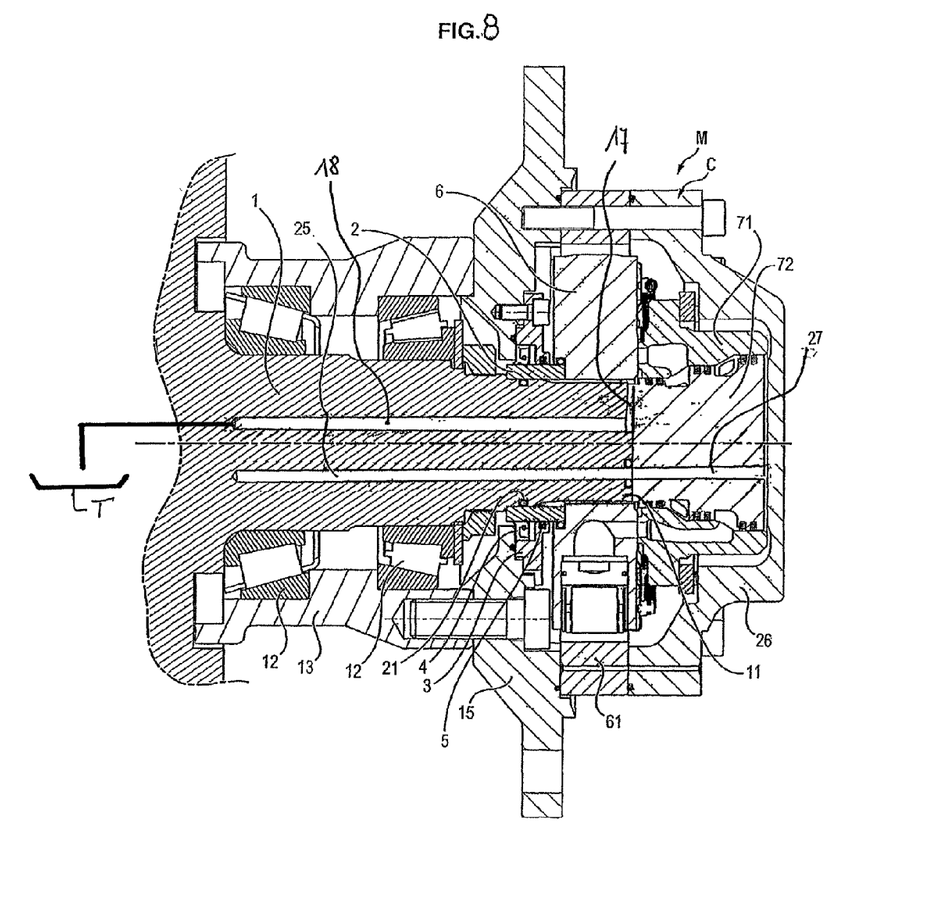
FIG. 8 illustrates a variant of the system according to the invention illustrated in FIG. 3 showing a second axial pipe arranged in the shaft, terminating at the distal end of the shaft and an axial pipe traversing the distributor so as to create an additional fluidic connection between the second axial pipe and the casing to allow regulation of the casing pressure.

FIG. 7 shows a variant of the embodiment shown in FIGS. 5 and 6.

Only the differences to the preceding embodiment will be described hereinbelow.

In the variant shown, the irrigation nozzle 86 and the irrigation valve 87 are arranged in a pipe arranged in the splined sleeve 8 which terminates in the longitudinal throats 16 arranged on the periphery of the shaft 1.

So instead of discharging the pressure to the casing of the motor M as in the embodiment shown in FIG. 5, the irrigation nozzle 86 and the irrigation valve 87 for discharging the pressure to the drain via the longitudinal throats 16 when the pressure reaches a sufficiently high value for the irrigation valve 87 to open.

The invention therefore provides a drain for leaks accumulating in the discharge chamber between the dynamic low-pressure sealing means 4 and the reinforced dynamic sealing means 5, protecting this discharge chamber and therefore protecting the dynamic low-pressure sealing means 4 from the variations in pressure which can occur in the casing of the hydraulic motor M, the hydraulic brake F, or more generally the hydraulic device in question.

The discharge chamber is placed in fluidic connection with a drain typically connected to an ambient-pressure tank T via pipes arranged especially on the surface of the shaft between the hydraulic device and the shaft.

The invention claimed is:

1. A system comprising:
    a shaft (1) presenting a distal end (11) and a proximal end,
    a casing (C) defining a housing under a casing pressure in which a hydraulic device (M) is rotatably mounted on the shaft (1), said hydraulic device being a hydraulic motor (M) comprising
        a multilobe cam (61) fixed to the casing,
        a cylinder block (6) placed on the shaft (1) opposite the cam (61),
        pistons guided to slide radially in respective cylinders of the cylinder block (6) and supported on the lobes of the cam (61), and
        a distributor (71, 72) intended to successively apply pressurised fluid to the pistons, arranged at the distal end of the shaft (1),
    a sealing member forming dynamic sealing between the shaft and the housing defined by the casing comprising low-pressure dynamic sealing means (4) around the shaft and reinforced dynamic sealing means (5) formed from a static sealing gasket (51) tightly mounted on a friction pad (51) between the low-pressure dynamic sealing means (4) and the hydraulic motor so as to isolate said dynamic sealing means (4) from the rotating hydraulic motor (M), and defining a discharge chamber between the dynamic sealing means (4) and the reinforced dynamic sealing means (5), wherein the system further comprises a first drain fluidly isolated from the casing and connected to an atmospheric pressure tank, and the discharge chamber is connected to the first drain (18) via a pipe (16) arranged on the surface of the shaft (1) between the hydraulic motor (M) and the shaft and a channel (17) arranged at the distal end (11) of the shaft (1) so as to create a fluidic connection between said pipe (16) arranged between the hydraulic motor (M) and the shaft (1) and a first axial pipe (18) arranged in the shaft (1) so as to discharge fluid located in the discharge chamber to the atmospheric pressure tank such that said discharge chamber is not subjected to the pressure prevailing in the casing (C) of the hydraulic device (M), the system further comprising means for fluidic connection between a second axial pipe (25) arranged in the shaft (1), terminating at the distal end of the shaft, and the casing (C), so as to form a second drain allowing regulation of the casing pressure (C) and allowing to control the casing pressure to manoeuvre the hydraulic motor, said first drain allowing to evacuate the fluid which accumulates in the discharge chamber during pressure points in the casing of the hydraulic motor and thus to discharge the leaks of the hydraulic motor.

2. The system according to claim 1, in which said pipe (16) arranged between the hydraulic motor (M, F) and the shaft (1) is a groove made at the periphery of the shaft (1), from its distal end (11) to the discharge chamber.

3. The system according to claim 1, in which said sealing member comprises a friction surface (2) tightly mounted on the shaft (1), on which is mounted the low-pressure dynamic sealing means (4), said friction surface (2) comprising a bore (22, 23) terminating on the pipe (16) arranged on the surface of the shaft (1) so as to connect the discharge chamber to said pipe (16).

4. The system according to claim 1, wherein
said sealing member comprises a friction surface (2) tightly mounted on the shaft (1), on which is mounted the low-pressure dynamic sealing means (4), said friction surface (2) comprising a bore (22, 23) terminating on the pipe (16) arranged on the surface of the shaft (1) so as to connect the discharge chamber to said pipe (16); and
in which said channel (17) at the distal end of the shaft (1) is arranged in the shaft (1).

5. The system of claim 1,
in which an axial pipe traversing (27) is arranged in the distributor (72) so as to create the fluidic connection between the second axial pipe arranged in the shaft (25) and the casing (1), independently of said first drain (18) connected to the discharge chamber.

6. The system according to claim 1, wherein
said sealing member comprises a friction surface (2) tightly mounted on the shaft (1), on which is mounted the low-pressure dynamic sealing means (4), said friction surface (2) comprising a bore (22, 23) terminating on the pipe (16) arranged on the surface of the shaft (1) so as to connect the discharge chamber to said pipe (16); and
in which said channel (17) at the distal end of the shaft (1) is arranged in the distributor (72).

7. A system comprising:
a shaft (1) presenting a distal end (11) and a proximal end,
a casing (C) defining a housing under a casing pressure in which a hydraulic device (F) is rotatably mounted on the shaft (1), said hydraulic device being a multidisc brake (F), comprising
a plurality of discs (81) mounted on a splined sleeve (8) fixed relative to the shaft (1),
a plurality of complementary discs (82) mounted non-rotatably relative to the casing (C),
control means (83, 84, 85) of the discs (81, 82) adapted to control their contacting,
a sealing member forming dynamic sealing between the shaft and the housing defined by the casing comprising low-pressure dynamic sealing means (4) around the shaft and reinforced dynamic sealing means (5) formed from a static sealing gasket (51) tightly mounted on a friction pad (51) between the low-pressure dynamic sealing means (4) and the hydraulic multidisc brake so as to isolate said dynamic sealing means (4) from the rotating hydraulic multidisc brake (F), and defining a discharge chamber between the dynamic sealing means (4) and the reinforced dynamic sealing means (5),
wherein the system further comprises a first drain fluidly isolated from the casing of the rotating hydraulic multidisc brake and connected to an atmospheric pressure tank, and the discharge chamber is connected to the first drain (18) via a pipe (16) arranged on the surface of the shaft (1) between the hydraulic multidisc brake (F) and the shaft and a channel (17) arranged at the distal end (11) of the shaft (1) so as to discharge fluid located in the discharge chamber to the atmospheric pressure tank such that said discharge chamber is not subjected to the pressure prevailing in the casing (C) of the hydraulic multidisc brake (F),
and further comprises a second drain allowing regulation of the casing pressure (C) of the hydraulic multidisc brake and allowing to control the casing pressure to manoeuvre the hydraulic multidisc brake,
said first drain allowing to evacuate the fluid which accumulates in the discharge chamber during pressure points in the casing of the hydraulic multidisc brake and thus to discharge the leaks of the hydraulic multidisc brake,
in which said pipe arranged between the hydraulic multidisc brake and the shaft is a groove (16) made at the periphery of the shaft (1) between the shaft (1) and the splined sleeve (8), from the distal end (11) of the shaft (1) to the discharge chamber.

8. The system according to claim 7, in which said pipe arranged between the hydraulic device (F) and the shaft (1) is connected to the housing of the casing comprising said discs (81, 82) via a valve (86, 87) adapted to produce discharge of the pressure in said housing via said pipe when the pressure in said housing is greater than or equal to a threshold value.

* * * * *